United States Patent
Vyas et al.

(10) Patent No.: US 9,690,685 B2
(45) Date of Patent: Jun. 27, 2017

(54) PERFORMANCE MANAGEMENT BASED ON RESOURCE CONSUMPTION

(71) Applicant: Apple Inc., Cupertino, CA (US)

(72) Inventors: Amit K. Vyas, San Jose, CA (US); Albert S. Liu, Fremont, CA (US); Anand Ramadurai, Los Gatos, CA (US); Drew A. Schmitt, Sunnyvale, CA (US); Russell A. Blaine, San Francisco, CA (US); Karen Crippes, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,466

(22) Filed: May 30, 2014

(65) Prior Publication Data
US 2015/0347262 A1  Dec. 3, 2015

(51) Int. Cl.
G06F 9/46 (2006.01)
G06F 11/34 (2006.01)
G06F 11/30 (2006.01)
G06F 9/50 (2006.01)

(52) U.S. Cl.
CPC ......... *G06F 11/3409* (2013.01); *G06F 9/505* (2013.01); *G06F 9/5022* (2013.01); *G06F 11/3024* (2013.01); *G06F 9/5011* (2013.01); *G06F 2209/5022* (2013.01)

(58) Field of Classification Search
CPC . G06F 9/5011; G06F 11/3024; G06F 11/3409
USPC ........................................................ 718/104
See application file for complete search history.

(56) References Cited

U.S. PATENT DOCUMENTS

| | | | |
|---|---|---|---|
| 7,440,751 B2* | 10/2008 | Boros | G06F 1/3203 455/405 |
| 7,827,358 B2 | 11/2010 | Watson et al. | |
| 8,117,505 B2* | 2/2012 | Sridharan et al. | 714/47.2 |
| 8,171,351 B1* | 5/2012 | Tomay | G06F 11/0742 714/47.1 |
| 8,359,389 B1* | 1/2013 | Cohen | H04W 4/20 705/23 |
| 8,442,484 B2* | 5/2013 | Rubin | H04L 47/14 455/405 |

(Continued)

OTHER PUBLICATIONS

Paulbrainerd, "Disable automatic application termination in OS X," Max OS X Hints, Aug. 2, 2012, last retrieved from http://hints.macworld.com/article.php?story=20120726192014497 on Feb. 17, 2017.*

(Continued)

*Primary Examiner* — Wei Zhen
*Assistant Examiner* — Andrew M Lyons
(74) *Attorney, Agent, or Firm* — Blakely, Sokoloff, Taylor & Zafman LLP

(57) ABSTRACT

A method and apparatus of a device for performance management by terminating application programs that consume an excessive amount of system resources is described. The device receives a resource consumption threshold and a detection period. The device further monitors a resource usage of an application program. The device determines whether the resource usage of the application program exceeds the resource consumption threshold for the detection period. The device further terminates the application program when the resource usage exceeds the resource consumption threshold for the detection period.

27 Claims, 9 Drawing Sheets

(56) References Cited

U.S. PATENT DOCUMENTS

| | | | |
|---|---|---|---|
| 8,578,394 B2* | 11/2013 | Srour et al. | 719/313 |
| 8,635,630 B2* | 1/2014 | Iyer et al. | 719/318 |
| 8,990,534 B2 | 3/2015 | Desai et al. | |
| 9,118,520 B1* | 8/2015 | Mao | G06Q 10/04 |
| 9,465,734 B1 | 10/2016 | Myrick et al. | |
| 2008/0276299 A1* | 11/2008 | Lee | G06F 1/3203 726/2 |
| 2011/0040990 A1* | 2/2011 | Chan | G06F 1/28 713/300 |
| 2011/0296416 A1* | 12/2011 | Kim | G06F 11/328 718/100 |
| 2012/0036498 A1* | 2/2012 | Akirekadu | G06F 11/3495 717/124 |
| 2012/0210321 A1 | 8/2012 | Silva et al. | |
| 2012/0233924 A1* | 9/2012 | Kitterman | E05F 17/00 49/77.1 |
| 2013/0047039 A1* | 2/2013 | Manes | G06F 11/3409 714/47.1 |
| 2013/0067263 A1* | 3/2013 | Liu | H04W 52/0225 713/340 |
| 2013/0097605 A1* | 4/2013 | Martinka | G06F 9/485 718/100 |
| 2013/0196616 A1* | 8/2013 | Zalmanovitch | H04W 24/02 455/405 |
| 2013/0347002 A1 | 12/2013 | Basu et al. | |
| 2014/0006809 A1* | 1/2014 | Udeshi | G06F 9/5094 713/300 |
| 2014/0007106 A1 | 1/2014 | Weksler et al. | |
| 2014/0115145 A1* | 4/2014 | Monk | H04L 43/04 709/224 |
| 2014/0281608 A1* | 9/2014 | Yin | G06F 1/3212 713/320 |
| 2015/0011177 A1* | 1/2015 | Gutierrez, Jr. | H04W 24/08 455/405 |
| 2015/0067405 A1* | 3/2015 | Hsieh | G06F 11/1412 714/39 |
| 2015/0133076 A1* | 5/2015 | Brough | H04W 24/10 455/405 |
| 2015/0347181 A1 | 12/2015 | Myrick et al. | |

OTHER PUBLICATIONS

Tufts, Andrew, "How to Monitor and Terminate Android Apps Running in the Background," One Click Root, Jan. 12, 2013, last retrieved from https://www.oneclickroot.com/how-to/how-to-monitor-and-terminate-android-apps-running-in-the-background on Feb. 17, 2017.*

Willis, John, "Android: keeping a background service alive (preventing process death)," Stack Overflow, Oct. 4, 2010, last retrieved from http://stackoverflow.com/questions/3856767/android-keeping-a-background-service-alive-preventing-process-death on Feb. 17, 2017.*

Xia, Mingyuan, et al., "Why Application Errors Drain Battery Easily? A Study of Memory Leaks in Smartphone Apps", Published in: HotPower '13 Proceedings of the Workshop on Power-Aware Computing and Systems, Article No. 2, Nov. 3, 2013, AMC New York, NY, USA, ISBN: 978-1-4503-2458-8, (5 pages).

* cited by examiner

PERFORMANCE MANAGEMENT BASED ON RESOURCE CONSUMPTION

FIELD OF THE DISCLOSURE

This disclosure relates generally to operating systems and more particularly to devices for performance management.

BACKGROUND

An operating system is a collection of software that manages device hardware resources and provides common services for computer programs. The operating system is a vital component of the system software in a device. The system software manages and integrates a computer's capabilities. The system software includes the operating system, utility software, device drivers, and other software tools. Application software can be considered to be all the computer software that causes a computer to perform useful tasks in response to user requests. A specific instance of application software is called a software application, application program, application or app, which are used interchangeably below. Application programs usually require an operating system to function.

As more and more services are becoming available for small or mobile devices, the number of applications running in a single device has increased significantly. Usually, a mobile device is used mostly for certain specific applications, while being equipped with general purpose computing capabilities. For example, it is common to find a mobile phone that also runs a browser application, a gaming application, and a media player application, etc. On the other hand, a mobile video player device may run a gaming application and/or an email application in addition to a video application. Multiple applications or processes in the same device compete with each other by sharing the same memory resources and computation resources embedded inside the device. The operating system performs resource/memory management to deal with resource contention in concurrent computing. Examples of resource/memory management techniques are described in U.S. Pat. No. 7,827,358, and U.S. publication numbers 2012/0179882 and 2013/0332936, all of which are incorporated herein by reference.

Usually there are several application programs running in the background of a device to perform various functions such as VoIP (Voice over Internet Protocol), maps, music, notifications, etc. Application programs that consume CPU or other resources of the device while running in the background can drain a significant amount of battery without the user's knowledge and/or can also affect the performance of an application running in the foreground such that the foreground application appears to the user to run slower or significantly slower as a result of background applications that consume significant CPU (or other) resources. When that happens, users experience decreased performance and/or decreased battery life with no tangible benefits.

SUMMARY OF THE DESCRIPTION

A method and apparatus of a device which terminates application programs that consume an excessive amount of one or more system resources is described. In an exemplary embodiment, the device can store a resource consumption threshold and a detection period. The device can further monitor a resource usage of an application program. The device can determine whether the resource usage of the application program exceeds the resource consumption threshold for the detection period. The device can terminate the application program when the resource usage exceeds the resource consumption threshold for the detection period.

In one embodiment, the device can further determine whether the application program is eligible for monitoring. The resource usage of the application program can be monitored after the application program is determined to be eligible for monitoring. In one embodiment, the application program is eligible for monitoring when the application program is running in the background and is not a daemon.

One embodiment of the device calculates an average resource usage for the detection period in order to determine whether the resource usage of the application program exceeds the resource consumption threshold for the detection period. In one embodiment, the resource consumption threshold includes a CPU consumption threshold. In another embodiment, the resource consumption threshold includes one of a networking usage threshold, a radio communication usage threshold, or a storage access threshold.

In one embodiment, the resource consumption threshold and the detection period are determined based on an analysis of resource usage by different application programs, and this analysis is updated over time and used to create updated values for the threshold and the detection period. In another embodiment, the resource consumption threshold and the detection period are determined based on an analysis of resource usage by the application program. In yet another embodiment, the resource consumption threshold and the detection period are determined based on an analysis of resource usage by a type of application program that includes the application program.

In one embodiment, the resource consumption threshold and the detection period are adjusted dynamically based on statistics of application programs that were terminated because resource usage exceeded the resource consumption threshold for the detection period. In another embodiment, the resource consumption threshold and the detection period are adjusted dynamically for a single application program based on statistics of the application program being terminated because resource usage exceeds the resource consumption threshold for the detection period. In one embodiment, the resource consumption threshold and the detection period are adjusted dynamically for a type of application program based on statistics of the type of application program that were terminated because resource usage exceeds the resource consumption threshold for the detection period.

Other methods and apparatuses are also described. Machine readable non-transitory media are also described and they include executable computer program instructions which when executed by a data processing system cause the data processing system to perform one or more methods described herein.

BRIEF DESCRIPTION OF THE DRAWINGS

The present disclosure is illustrated by way of example and not limitation in the figures of the accompanying drawings in which like references indicate similar elements.

DETAILED DESCRIPTION

Figure 1:
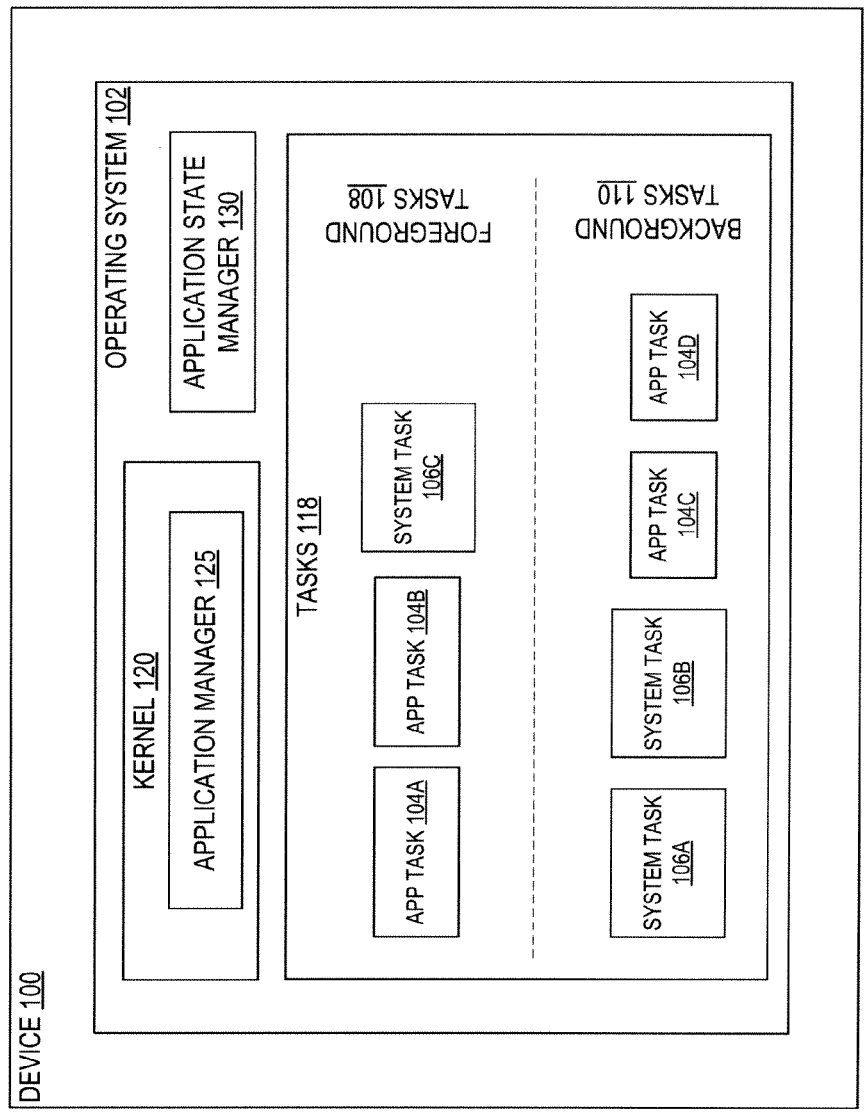
FIG. 1 is a block diagram of one embodiment of a device that performs performance management based on resource consumption.

A method and apparatus of a device that terminates one or more background running applications that are excessively using resources in order to reduce power consumption of the device or otherwise improve the performance of the device is described. In the following description, numerous specific details are set forth to provide thorough explanation of embodiments of the disclosure. It will be apparent, however, to one skilled in the art, that embodiments of the disclosure may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the disclosure. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose device or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that terminates one or more background running applications that are using excessive system resources in order to reduce power consumption of (or otherwise improve the performance of) the device is described. Application programs running in the background of a device can consume an excessive amount of system resources (e.g., CPU, networking, radio communication, and storage access) for a prolonged period of time. As a result, these application programs can drain a significant amount of battery power without the user's knowledge. In one embodiment, the device monitors resource usage of a background application. When the resource usage of the background application exceeds a resource consumption threshold for a detection period, the device terminates the background application. In one embodiment, the resource consumption threshold and the detection period are determined based on an analysis of resource usage by different application programs. In one embodiment, the resource consumption threshold and the detection period are adjusted dynamically based on statistics of application programs that were terminated by this method.

FIG. 1 is a block diagram of one embodiment of a device 100 that performs performance management based on resource consumption. In one embodiment, the device 100 can be a desktop computer, server, smartphone, laptop, personal digital assistant, music playing device, gaming device, consumer electronic device, or any other device that can execute multiple processes. In FIG. 1, device 100 includes an operating system 102 that is a set of software used to manage device hardware resources and provides common services for other running computer programs, such as application programs. The operating system 102 includes a kernel 120 and an application state manager 130, and manages several tasks 118.

In one embodiment, the operating system 102 manages several running tasks 118 by scheduling a processor of the device 100 to execute each of the running tasks. The tasks 118 can include two categories: foreground tasks 108 and background tasks 110. As illustrated in FIG. 1, the foreground tasks 108 include application tasks 104A and 104B, and a system task 106C. The background tasks 110 include system tasks 106A and 106B, and application tasks 104C and 104D. An application task is an instance of an application program that is being executed. A system task is an instance of a system software that is being executed.

In one embodiment, a task is a process that is an instance of a computer program that is being executed. In this embodiment, the task may be an application program that is executing as a result of user input. Another example of a task is a system process that provides one or more services to an application program, another system process, other process, etc. For example, in one embodiment, a system process gives a status of wireless hotspot service, lists installed applications, facilitates a search (such as a search using Spotlight), monitors and adjusts device power settings, etc. In another embodiment, a task is a thread that is the smallest sequence of programmed instructions that can be managed independently by an operating system scheduler. In one embodiment, a thread is contained inside a process. Multiple threads can exist within the same process and share resources such as memory, while different processes do not share these resources in one embodiment.

A foreground task is, in one embodiment, a task that is interacting with a user. A background task is, in one embodiment, a task that is not interacting with the user. Examples of background tasks may include audio playback, location related services (e.g., GPS location services, maps, etc.), radio communications (e.g., Bluetooth, Wi-Fi, and cellular), network communications, VoIP, etc. For example and in one embodiment, an application task 104A running in the foreground on device 100 may be an application that is displayed on an output device of the device 100. In this embodiment, the device 100 can concurrently run one or more system tasks that are not displayed on the device and are instead communicating with other tasks. These system tasks would be executing in the background and not directly visible to the user. In another embodiment, the background tasks may be partially or fully viewable, but are not the focus of the device's user interface.

In one embodiment in which the system displays multiple windows, the foreground task controls or provides the front most window while background tasks may have no windows or windows which are obscured by the one or more windows of the foreground task. Moreover, the foreground task typically has the focus of one or more input devices such as mice or touchpad or touchscreen interfaces or a keyboard such that an input from these input devices is directed to and received by the foreground task. A daemon is a computer program that runs as a background process, rather than being under the direct control of an interactive user.

The kernel 120 includes an application manager 125. In FIG. 1, and in one embodiment, the kernel 120 handles the termination of application tasks and manages the state of application tasks. In another embodiment, the kernel 120 handles the termination of application tasks using the application manager 125, and the application state manager 130 handles the state of application tasks and determines when an application transitions between a background state and a foreground state. In one embodiment, an application task can be terminated when the application task is in an eligible state. In one embodiment, an application task is in an eligible state when the application task is a background task that is not a daemon. The application manager 125 monitors an application task when the application task is in an eligible state. If the monitored application task consumes an excessive amount of resources for a prolonged period of time, the application manager 125 terminates the application task.

Figure 2:
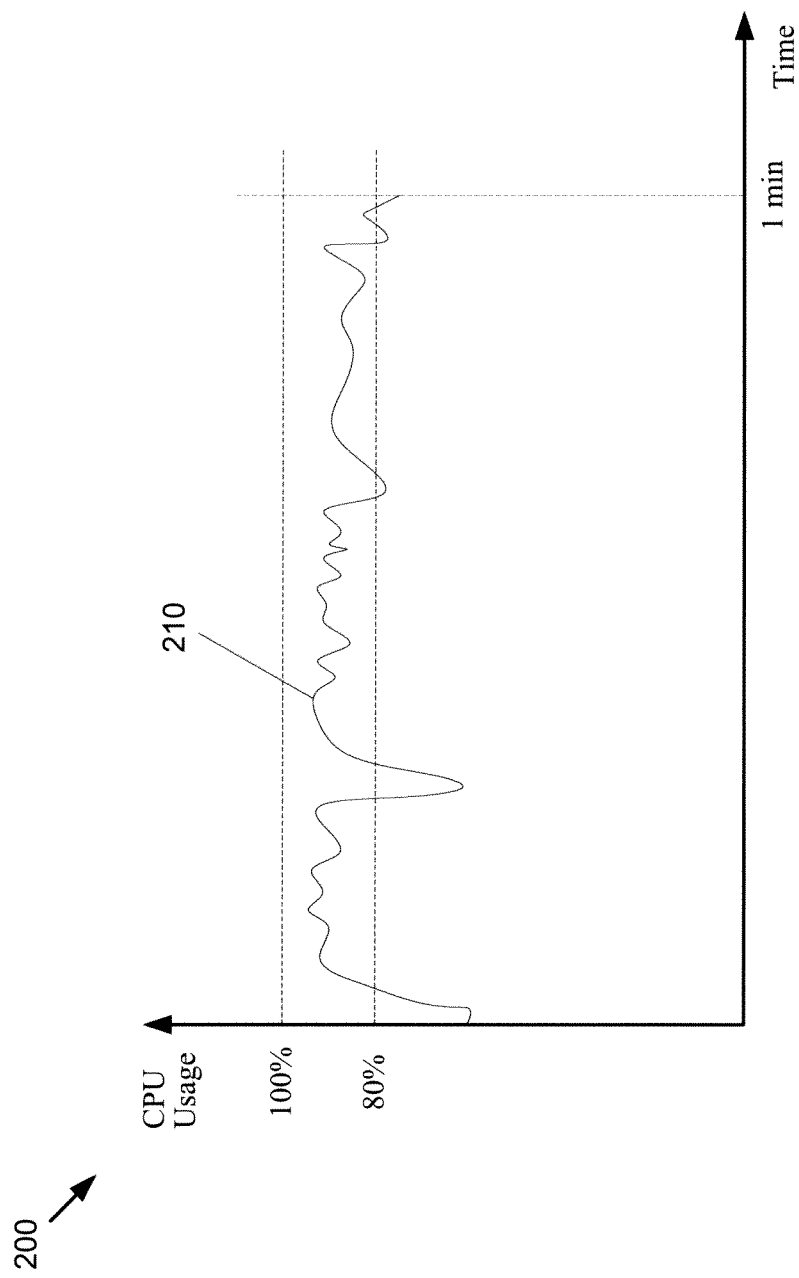
FIG. 2 illustrates a chart showing CPU usage by an application program over a period of time.

FIG. 2 illustrates a chart 200 showing CPU usage by an application program over a period of time. Specifically, FIG. 2 illustrates a CPU usage curve 210 over one minute of time for the application program. In one embodiment, a CPU consumption threshold is set at 80% for an application program, which means the application program is considered to be using an excessive amount of CPU resources when it uses more than 80% of the CPU processing capability while it is in a background state.

As shown in the figure, the CPU usage curve 210 fluctuates over time. Therefore, in one embodiment, an application program is considered to be using an excessive amount of CPU when it exceeds the CPU consumption threshold for a prolonged period of time, e.g., 1 minute. In one embodiment, an average CPU usage for the entire period of time is calculated to determine if the application program has exceeded the CPU consumption threshold. In another embodiment, an average CPU usage is calculated based on CPU usage at several sampling points during the period of time to determine if the application program has exceeded the CPU consumption threshold. One of ordinary skill in the art will recognize that there are other methods to determine if an application program has exceeded the CPU consumption limit for a period of time. For example and in one embodiment, CPU usage statistics are collected at several sampling points during the period of time, and if a vast majority (e.g., 80%) of these statistics exceed the CPU consumption threshold, the application program will be deemed to have exceeded the CPU consumption threshold.

Figure 3:
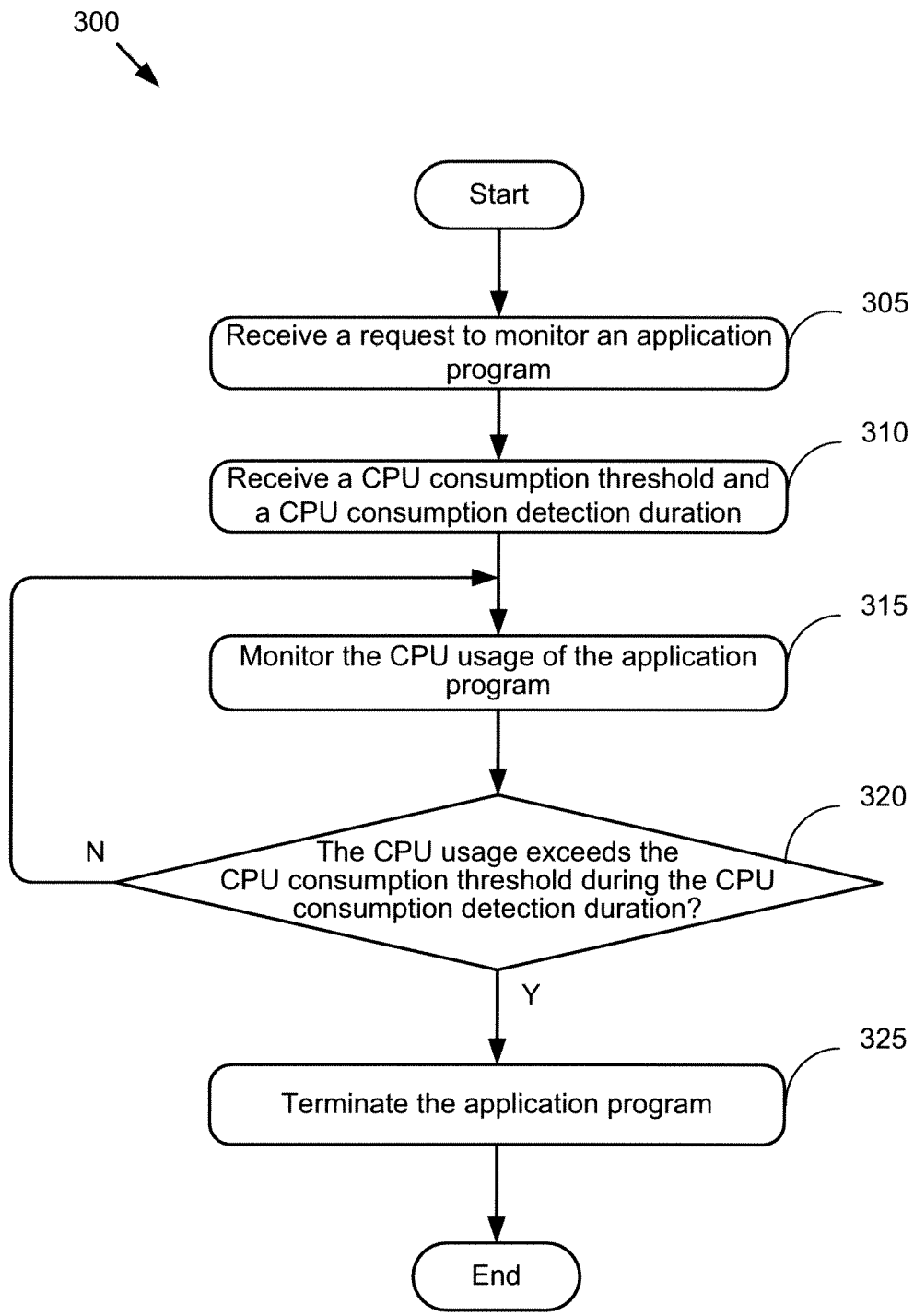
FIG. 3 illustrates a flowchart of one embodiment of a process to terminate an application program based on excessive CPU usage of the application program.

FIG. 3 illustrates a flowchart of one embodiment of a process 300 to terminate an application program based on excessive CPU usage of the application program. In one embodiment, the application manager 125 described in FIG. 1 above executes process 300 to terminate the application program based on excessive CPU usage. In FIG. 3, process 300 begins by receiving (at block 305) a request to monitor an application program. In one embodiment, the application state manager 130 described above in FIG. 1 sends the request to the application manager 125 when the application state manager 130 determines that the application program is eligible for monitoring. In one embodiment, the request received in block 305 can originate from block 515 in FIG. 5. In one embodiment, an application program is eligible for monitoring if the application program is running in the background and the application program is not a daemon (and the application program is not eligible for monitoring if it is in the foreground state or is a daemon process). In one embodiment, the application program is an application task described in FIG. 1 above, and can be either a process or a thread.

At block 310, process 300 receives a CPU consumption threshold and a CPU consumption detection duration which have been previously stored in non-volatile storage in the system. In one embodiment, the CPU consumption threshold is 80%. In one embodiment, the CPU consumption detection duration is 1 minute. When an application program exceeds the CPU consumption threshold for at least the CPU consumption detection duration, the application program is considered to be using an excessive amount of CPU resources. In one embodiment, the CPU consumption threshold and the CPU consumption detection duration is the same for all application programs. In another embodiment, different application programs can have different CPU consumption thresholds and different CPU consumption detection durations.

At block 315, process 300 monitors the CPU usage of the application program. Process 300 determines (at block 320) whether the CPU usage of the application program exceeds the CPU consumption threshold for a time period that is at least as long as the CPU consumption detection duration. If the CPU usage of the application program exceeds the CPU consumption threshold for a time period that is at least as long as the CPU consumption detection duration, process 300 terminates (at block 325) the application program. Otherwise, process 300 loops back to block 315 to continue monitoring the CPU usage of the application program. In one embodiment, the monitoring of the CPU usage of the application program is a continuous process (while the application is designated as eligible for monitoring) in which the latest CPU usage over a time period of the CPU consumption detection duration is evaluated to perform the operations at blocks 315 and 320. If the application's state changes (e.g., it becomes the foreground application) then the monitoring in FIG. 3 stops for that application.

One of ordinary skill in the art will recognize that process 300 is a conceptual representation of the operations used to perform performance management based on resource consumption. The system resource being monitored can be different. For example, instead of or in addition to monitoring CPU usage, process 300 can monitor one or more of networking, radio communication, or storage access of the application program to determine whether or not the application program is using an excessive amount of system resources, thereby draining the battery of the device or otherwise affecting the device's performance. The specific operations of process 300 may not be performed in the exact order shown and described. The specific operations may not be performed in one continuous series of operations, and different specific operations may be performed in different embodiments. Furthermore, process 300 could be implemented using several sub-processes, or as part of a larger macro process.

Figure 4:
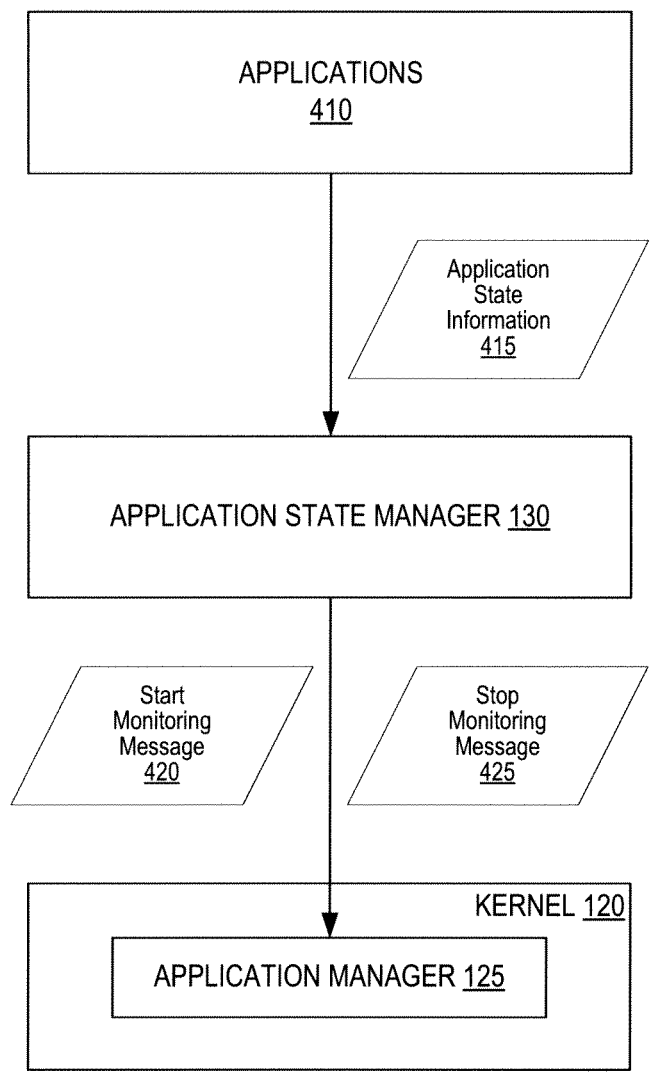
FIG. 4 illustrates a diagram of modules of the operating system that terminate applications that are using excessive system resources for a prolonged period of time.

FIG. 4 illustrates a diagram of modules of the operating system that terminate applications that are using excessive system resources for a prolonged period of time. Specifically, this figure illustrates an application state manager 130 and an application manager 125 of the kernel 120 of the operating system.

The application state manager 130 receives application state information 415 from the applications 410. In one embodiment, each application in the applications 410 is an application task described in FIG. 1 above, and can be either a process or a thread of an application program. In one embodiment, the application state information 415 includes data indicating whether an application is running in the foreground or in the background. In one embodiment, the application state information 415 includes data indicating whether an application is a daemon. The application state manager 130 determines whether an application is eligible for monitoring based on the application state information 415. In one embodiment, an application is eligible for monitoring when the application is running in the background and is not a daemon (and is not eligible for monitoring when it is either a foreground process or is a daemon process).

If the application is eligible for monitoring, the application state manager 130 sends a start monitoring message 420 to the application manager 125 and the application manager 125 starts performing operations described in FIG. 3 above. If the application is not eligible for monitoring, the application state manager 130 sends a stop monitoring message 425 to the application manager 125 and the application manager 125 stops performing operations described in FIG. 3 above.

Figure 5:
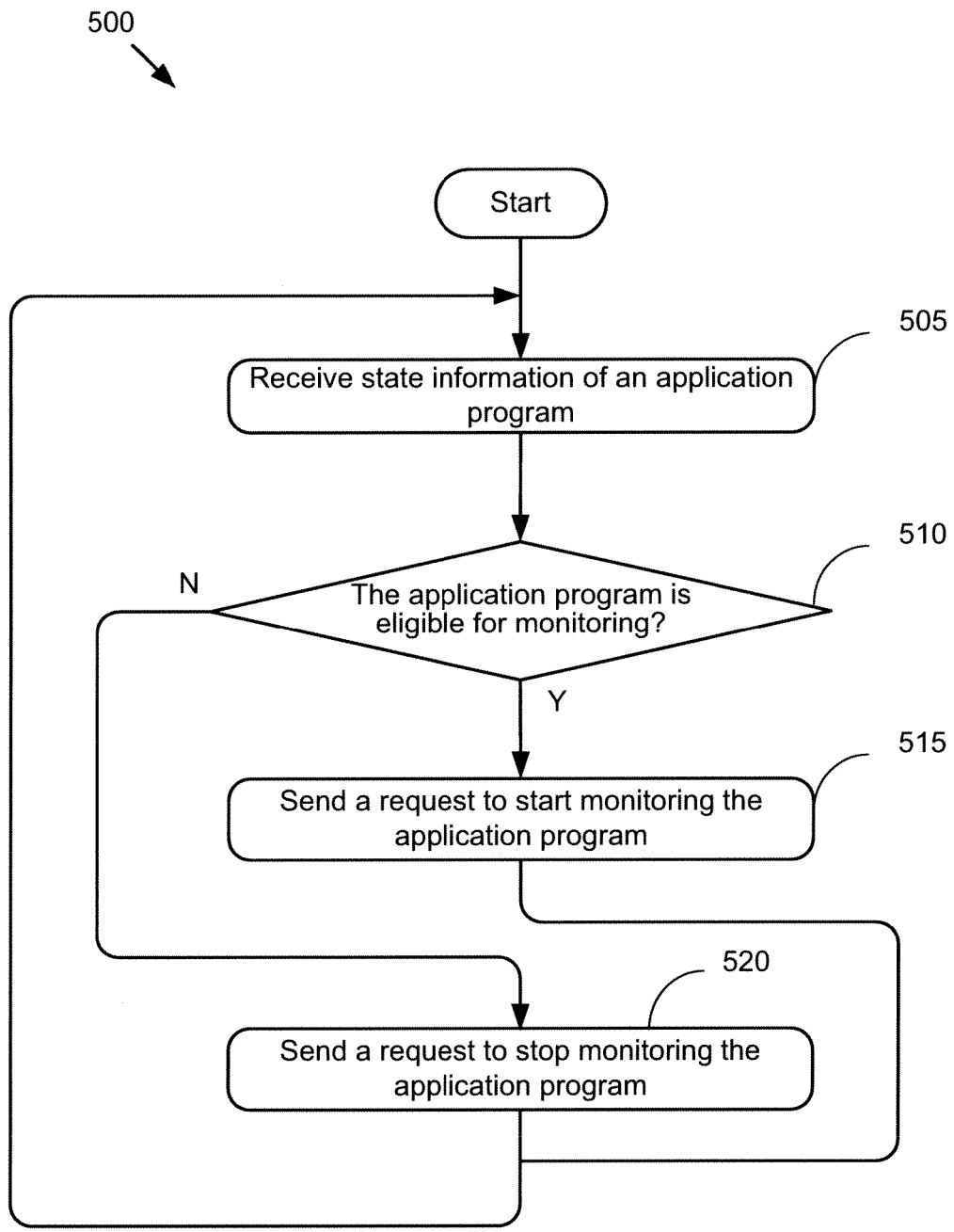
FIG. 5 illustrates a flowchart of one embodiment of a process to determine whether an application program is eligible for monitoring.

FIG. 5 illustrates a flowchart of one embodiment of a process 500 to determine whether an application program is eligible for monitoring. In one embodiment, the application state manager 130 described in FIGS. 1 and 4 above executes process 500 to make a determination whether an application program should be monitored for its consumption of system resources. In FIG. 5, process 500 begins by receiving (at block 505) state information of an application program. In one embodiment, the state information indicates whether the application program is running in the foreground or in the background. In one embodiment, the state information indicates whether an application is a daemon. In one embodiment, process 500 receives the state information from the application program. In one embodiment, the application program is an application task described in FIG. 1 above, and can be either a process or a thread.

At block 510, process 500 determines whether the application program is eligible for monitoring. In one embodiment, the application program is eligible for monitoring when it is running in the background and is not a daemon and is not eligible for monitoring when it is running in the foreground or is a daemon process. In one embodiment, the identification of the application program is checked against a lookup table to determine whether the application program is eligible for monitoring.

When the application program is eligible for monitoring, process 500 sends (at block 515) a request to start monitoring the application program. When the application program is not eligible for monitoring, process 500 sends (at block 520) a request to stop monitoring the application program. A change in an application's state (such as from background to foreground) will cause the block 520 to send a request to stop monitoring. In one embodiment, the requests are sent to the application manager 125 described in FIGS. 1 and 4 above. Process 500 can repeat in a loop over time such that block 505 follows block 520.

One of ordinary skill in the art will recognize that process 500 is a conceptual representation of the operations used to determine whether an application program should be monitored. The specific operations of process 500 may not be performed in the exact order shown and described. The specific operations may not be performed in one continuous series of operations, and different specific operations may be performed in different embodiments. Furthermore, process 500 could be implemented using several sub-processes, or as part of a larger macro process.

Figure 6:
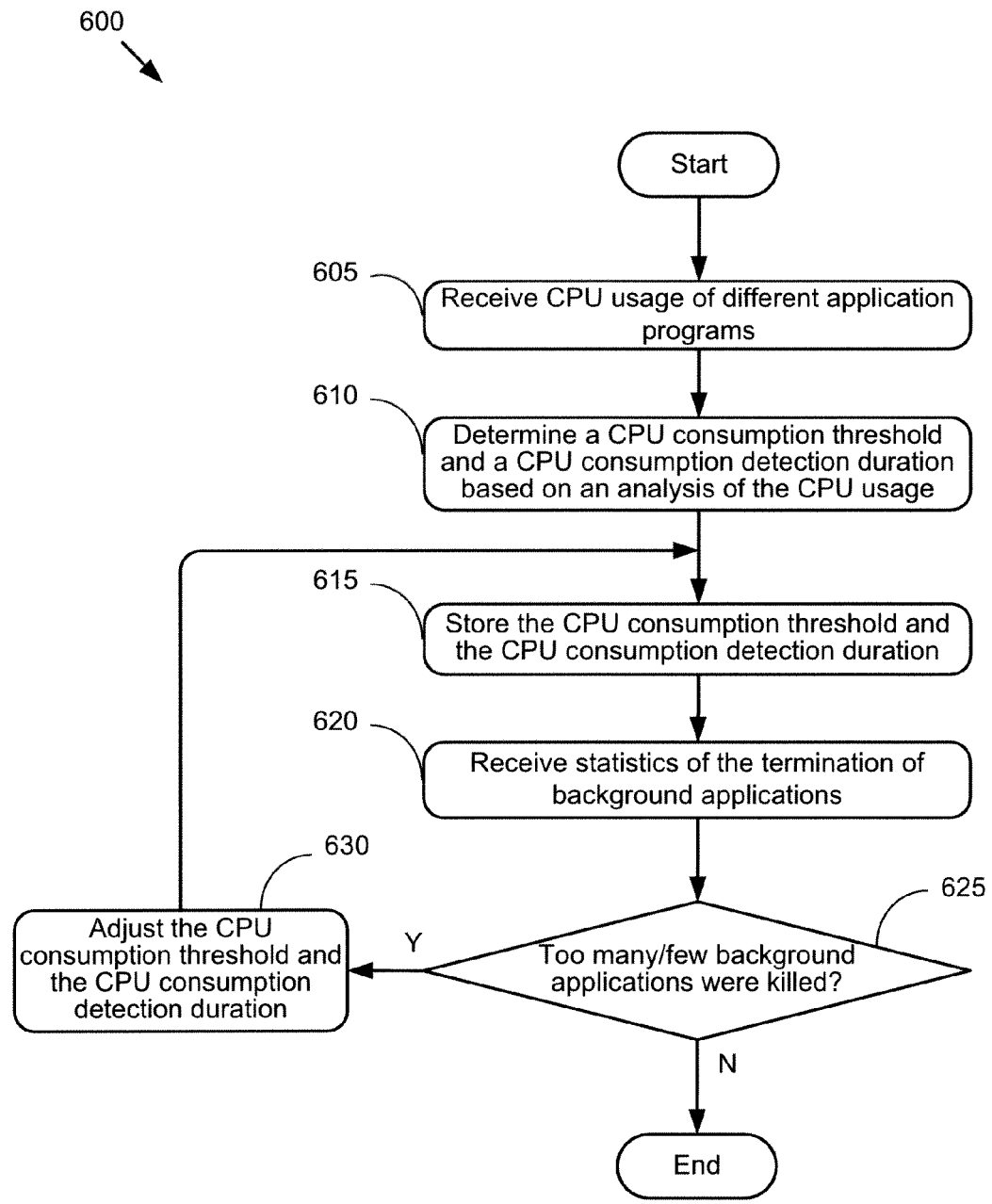
FIG. 6 illustrates a flowchart of one embodiment of a process to determine and adjust CPU consumption threshold and CPU consumption detection duration.

FIG. 6 illustrates a flowchart of one embodiment of a process 600 to determine and adjust CPU consumption threshold and CPU consumption detection duration. In one embodiment, the application manager 125 described in FIGS. 1 and 4 above executes process 600 to determine and adjust a CPU consumption threshold and a CPU consumption detection duration. In FIG. 6, process 600 begins by receiving (at block 605) CPU usage data of different application programs. In one embodiment, the CPU usage data includes patterns of CPU usage by different application programs. In one embodiment, each application program is an application task described in FIG. 1 above, and can be either a process or a thread.

At block 610, process 600 determines a CPU consumption threshold and a CPU consumption detection duration based on an analysis of the CPU usage data. In one embodiment, the CPU consumption threshold is determined to be 80% for applications running in the background because almost all such applications do not use more than 80% of the CPU's resources. In one embodiment, the CPU consumption detection duration is determined to be 1 minute. When an application program exceeds the CPU consumption threshold for at least the CPU consumption detection duration, the application program is considered to be using an excessive amount of CPU resources. In one embodiment, the CPU consumption threshold and the CPU consumption detection duration is the same for all application programs. In another embodiment, the CPU consumption threshold and the CPU consumption detection duration may be associated with a particular application program or a type of application program.

At block 615, process 600 stores the CPU consumption threshold and the CPU consumption detection duration in non-volatile storage in the system. In one embodiment, the CPU consumption threshold and the CPU consumption detection duration are stored for use by process 300 described in FIG. 3 above. Process 600 receives (at block 620) statistics of the termination of background applications. In one embodiment, the termination of background applications was carried out by process 300 described in FIG. 3 above.

At block 625, process 600 determines whether too many or too few background applications were killed by analyzing the statistics of the termination of background applications. If too many background applications were killed, process 600 adjusts (at block 630) the CPU consumption threshold and the CPU consumption detection duration by increasing the CPU consumption threshold (e.g., from 80% to 85%) and/or increasing the CPU consumption detection duration (e.g., from 1 minute to 2 minutes). If too few background applications were killed, process 600 adjusts (at block 630) the CPU consumption threshold and the CPU consumption detection duration by decreasing the CPU consumption threshold and/or shortening the CPU consumption detection duration. Process 600 then loops back to block 615 to send the adjusted CPU consumption threshold and the adjusted CPU consumption detection duration.

All or parts of process 600 can be performed by a server system that collects CPU usage statistics from a large number of client devices that perform the processes of FIGS. 3 and 5 and have the architecture shown in FIG. 4. These client devices can provide CPU usage data to the server device which can analyze the data (by, for example, using the method of FIG. 6) and then the server device can determine a new CPU consumption threshold and/or detection period and these new values can be downloaded to the client devices. For example, these new values can be downloaded to the client devices when the client devices perform a software update operation.

In one embodiment, the adjustment of the CPU consumption threshold and the CPU consumption detection duration is performed dynamically after the operating system has been installed on the device. In one embodiment, the CPU consumption threshold and the CPU consumption detection duration are the same for all application programs. Therefore the adjustment of the CPU consumption threshold and the CPU consumption detection duration is based on statistics of the termination of all application programs. In another embodiment, the CPU consumption threshold and the CPU consumption detection duration is associated with a particular application program or a type of application program. Therefore, the adjustment of the CPU consumption threshold and the CPU consumption detection duration is based on statistics of the termination of the particular application program (e.g., frequency that the particular application program was killed) or statistics of the termination of the type of application program (e.g., percentage that the type of application program was killed).

One of ordinary skill in the art will recognize that process 600 is a conceptual representation of the operations used to perform performance management based on resource consumption. The system resource being monitored can be different. For example, instead of determining thresholds for CPU usage, process 600 can determine consumption threshold and consumption detection duration for networking, radio communication, or storage access by analyzing corresponding usage data, and adjust the consumption threshold and consumption detection duration similarly. The specific operations of process 600 may not be performed in the exact order shown and described. The specific operations may not be performed in one continuous series of operations, and different specific operations may be performed in different embodiments. Furthermore, process 600 could be implemented using several sub-processes, or as part of a larger macro process.

Figure 7:
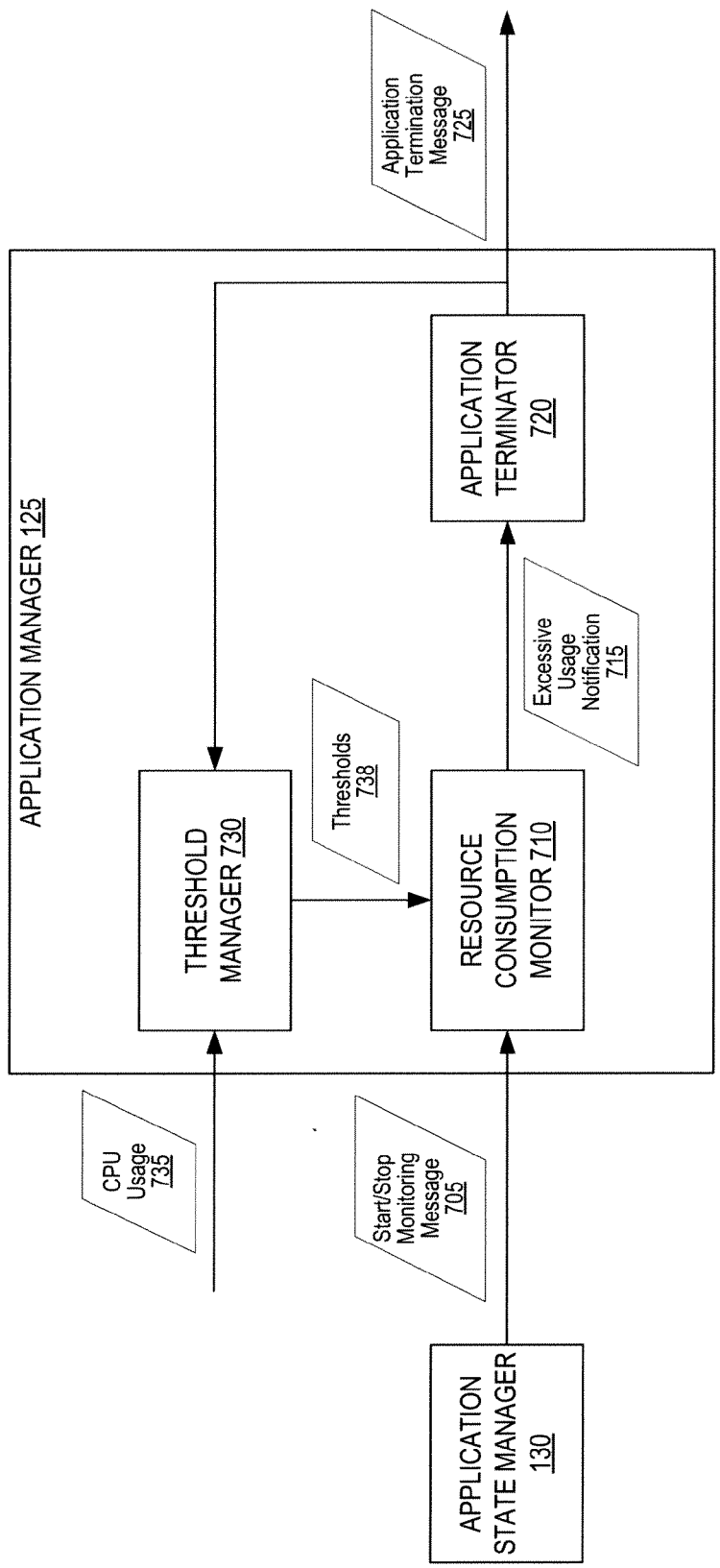
FIG. 7 illustrates a detailed diagram of the application manager of one embodiment.

FIG. 7 illustrates a detailed diagram of the application manager 125 of one embodiment. Specifically, this figure illustrates a set of modules for managing the monitoring of application programs. In one embodiment, each application program is an application task described in FIG. 1 above, and can be either a process or a thread. In one embodiment, the application manager 125 is used by a kernel of an operating system to facilitate performance management, such as kernel 120 of FIG. 1. As shown in FIG. 7, the application manager 125 includes a resource consumption monitor 710, an application terminator 720, and a threshold manager 730.

The threshold manager 730 receives CPU usage 735 of different application programs, performs an analysis on the CPU usage and determines a CPU consumption threshold and a CPU consumption detection period. In one embodiment, the CPU consumption threshold and the CPU consumption detection duration is the same for all application programs. In another embodiment, the CPU consumption threshold and the CPU consumption detection duration may be associated with a particular application program or a type of application program. The threshold manager 730 then sends the thresholds 738 to the resource consumption monitor 710. In one embodiment, the thresholds 738 include the CPU consumption threshold and the CPU consumption detection period. In one embodiment, the threshold manager 730 performs operations as described above in blocks 605-615 of FIG. 6.

The resource consumption monitor 710 receives start/stop monitoring message 705 from the application state manager 130. If the start/stop monitoring message 705 calls for starting monitoring of an application program, the resource consumption monitor 710 will start to monitor the application program using the thresholds 738 received from the threshold manager 730. If the start/stop monitoring message 705 calls for stopping monitoring of an application program, the resource consumption monitor 710 will stop monitoring the application program. In one embodiment, the resource consumption monitor 710 determines that the application program is using an excessive amount of CPU resources if the application program exceeds the CPU consumption threshold for a time period that is at least as long as the CPU consumption detection period. Once the resource consumption monitor 710 determines that the application program is using an excessive amount of CPU resources, the resource consumption monitor 710 sends an excessive usage notification 715 to the application terminator 720. In one embodiment, the resource consumption monitor 710 performs operations as described above in FIG. 3.

The application terminator 720 receives the excessive usage notification 715 regarding the application program from the resource consumption monitor 710. The application terminator 720 then terminates the application program by sending out an application termination message 725 regarding the application program.

In one embodiment, the threshold manager 730 keeps tracks of the application programs terminated by the resource consumption monitor 710 and the application terminator 720. The threshold manager 730 determines whether too many or too few application programs were killed by the resource consumption monitor 710 and the application terminator 720. If too many application programs were killed, the threshold manager 730 increases the CPU consumption threshold (e.g., from 80% to 85%) and/or increases the CPU consumption detection duration. If too few application programs were killed, the threshold manager 730 decreases the CPU consumption threshold (e.g., from 80% to 70%) and/or shortens the CPU consumption detection duration. The threshold manager 730 then sends the updated thresholds 738 to the resource consumption monitor 710. In one embodiment, the threshold manager 730 performs operations as described in blocks 615-630 of FIG. 6 above.

In one embodiment, the CPU consumption threshold and the CPU consumption detection duration is the same for all application programs. Therefore, the adjustment of the CPU consumption threshold and the CPU consumption detection duration is based on statistics of the termination of all application programs. In another embodiment, the CPU consumption threshold and the CPU consumption detection duration is associated with a particular application program or a type of application program. Therefore the adjustment of the CPU consumption threshold and the CPU consumption detection duration is based on statistics of the termination of the particular application program (e.g., frequency that the particular application program was killed) or statistics of the termination of the type of application program (e.g., percentage that the type of application program was killed).

The application manager 125 was described above for one embodiment of the disclosure. One of ordinary skill in the art will recognize that the system resource being monitored can be different. For example, instead of monitoring CPU usage of the application program, the resource consumption monitor 710 can monitor networking, radio communication, or storage access of the application program to determine whether or not the application program is using an excessive amount of system resources, thereby draining the battery of the device. One of ordinary skill in the art will realize that in other embodiments, this module can be implemented differently. For instance, in one embodiment described above, certain modules are implemented as software modules. However, in another embodiment, some or all of the modules might be implemented by hardware, which can be dedicated application specific hardware (e.g., an ASIC chip or component) or a general purpose chip (e.g., a microprocessor or FPGA).

Figure 8:
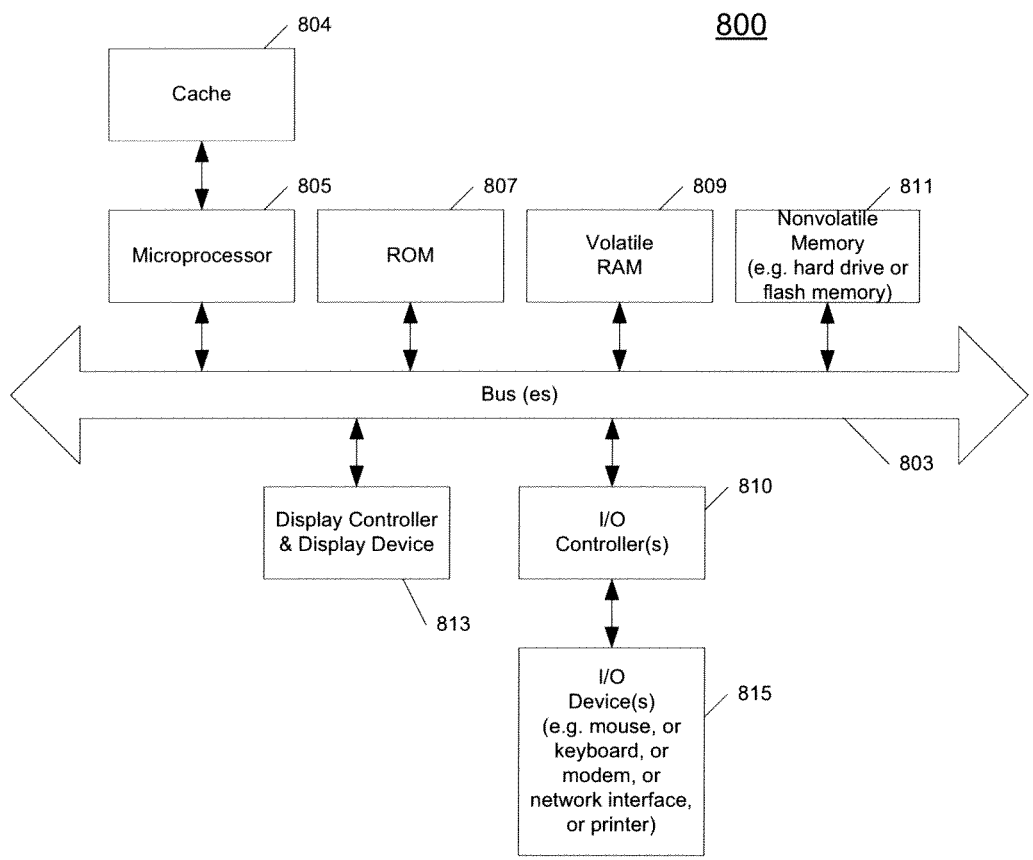
FIG. 8 illustrates one example of a data processing system, which may be used with one embodiment.

FIG. 8 shows one example of a data processing system 800, which may be used with one embodiment of the disclosure. For example, the system 800 may be implemented including a device 100 as shown in FIG. 1. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices 815 which may be mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
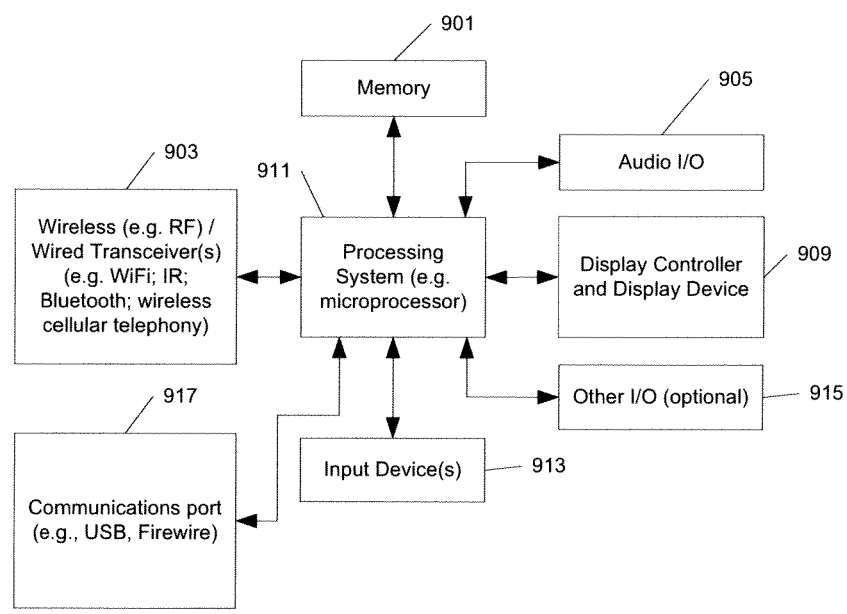
FIG. 9 illustrates one example of another data processing system, which may be used with one embodiment.

FIG. 9 shows an example of another data processing system 900 which may be used with one embodiment. For example, system 900 may be implemented as a device 100 as shown in FIG. 1. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905, which may include a microphone and a speaker, for example, for playing back music or providing telephone functionality through the speaker and microphone.

A display controller and display device 909 provide a visual user interface for the user; this digital interface may include a graphical user interface which is similar to that shown on a Macintosh computer when running OS X operating system software, or Apple iPhone when running the iOS operating system, etc. The system 900 also includes one or more wireless transceivers 903 to communicate with another data processing system, such as the system 900 of FIG. 9. A wireless transceiver may be a WLAN transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system. The system 900 further includes one or more communication ports 917 to communicate with another data processing system, such as the system in FIG. 8. The communication port may be a USB port, Firewire port, Bluetooth interface, etc.

The data processing system 900 also includes one or more input devices 913, which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld device or a personal digital assistant (PDA), or a cellular telephone with PDA like functionality, or a handheld device which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 900 may be a network computer or an embedded processing device within another device, or other types of data processing systems, which have fewer components or perhaps more components than that shown in FIG. 9.

At least certain embodiments of the disclosure may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in U.S. Pat. No. 7,345,671 and U.S. Pat. No. 7,627,343, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a computer readable storage medium, such as, but not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a device bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "storing," "determining," "monitoring," "terminating," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

The foregoing discussion merely describes some exemplary embodiments of the disclosure. One skilled in the art will readily recognize from such discussion, the accompanying drawings and the claims that various modifications can be made without departing from the spirit and scope of the disclosure.

What is claimed is:

1. A computer-implemented method for performance management of a data processing system, the method comprising:
    selecting a first application program having a first application program type for resource usage monitoring, wherein the first application program is running in a background state while the first application program is executing one or more first application tasks or one or more system tasks and is not directly interacting with the user or directly viewable by a user of the data processing system, and the first application program is not a daemon;

determining a resource consumption threshold and a detection period for the first application program having the first application program type, wherein the resource consumption threshold and the detection period for the first application program are based at least in part on the first application program type;

monitoring a resource usage of the first application program, in response to selecting the first application program for resource usage monitoring and determining the resource consumption threshold and detection period for the first application program;

determining whether the monitored resource usage of the first application program exceeds the resource consumption threshold over the duration of the detection period;

terminating the first application program when the resource usage exceeds the resource consumption threshold over the duration of the detection period;

receiving statistics characterizing one or more previous terminations of a plurality of application programs having the first application program type;

dynamically adjusting the detection period of the first application program type based on the statistics.

2. The method of claim 1 further comprising:

terminating monitoring of resource usage of the first application program in response to determining that the first application program is no longer in the background state.

3. The method of claim 1, wherein the determining that the resource consumption of the first application program exceeds the resource consumption threshold comprises determining that the average resource consumption over the duration of the detection period for the first application program exceeds the resource consumption threshold.

4. The method of claim 1, further comprising terminating monitoring of resource usage of the first application program in response to determining that the first application program is running in the foreground.

5. The method of claim 1, wherein the determining of whether the resource usage of the first application program exceeds the resource consumption threshold over the detection period comprises determining whether resource usage exceeds the resource consumption threshold for a time period that is at least as long as the detection period.

6. The method of claim 1, wherein the resource consumption threshold comprises a CPU consumption threshold.

7. The method of claim 1, wherein the resource consumption threshold comprises one of a networking usage threshold, a radio communication usage threshold, or a storage access threshold.

8. The method of claim 1, wherein the resource consumption threshold and the detection period are based on an analysis of resource usage by different application programs.

9. The method of claim 1, wherein dynamically adjusting comprises:

increasing at least one of the detection period or the resource consumption threshold for applications having the first application program type, in response to the statistics indicating that fewer applications of the first application program type should be terminated, or decreasing at least one of the detection period or the resource consumption threshold for applications having the first application program type, in response to the statistics indicating that more applications of the first application program type should be terminated.

10. The method of claim 9, wherein a second application program has a second type having at least one of a different detection period or a different resource consumption threshold than the first application program type.

11. A non-transitory machine-readable medium having executable instructions to cause one or more processing units to perform a method of performance management of a data processing system, the method comprising:

selecting a first application program for resource usage monitoring, wherein the first application program is running in a background state while the first application program is executing one or more first application tasks or one or more system tasks and is not directly interacting with the user or directly viewable by a user of the data processing system, and the first application program is not a daemon;

determining a resource consumption threshold and a detection period for the first application program having a first application program type, wherein the resource consumption threshold and the detection period for the first application program are based at least in part on the first application program type;

monitoring resource usage of the first application program, in response to selecting the first application program for resource usage monitoring and determining the resource consumption threshold and detection period for the first application program;

determining whether the monitored resource usage of the first application program exceeds the resource consumption threshold over the duration of the detection period;

terminating the first application program when the resource usage exceeds the resource consumption threshold over the duration of the detection period;

receiving statistics characterizing one or more previous terminations of a plurality of application programs having the first application program type;

dynamically adjusting the detection period of the first application program type based on the statistics.

12. The non-transitory machine-readable medium of claim 11, wherein the determining of whether the resource usage of the first application program exceeds the resource consumption threshold over the detection period comprises determining whether resource usage exceeds the resource consumption threshold for a time period that is at least as long as the detection period.

13. The non-transitory machine-readable medium of claim 11, wherein the resource consumption threshold comprises a CPU consumption threshold.

14. The non-transitory machine-readable medium of claim 11, wherein the method further comprises:

terminating monitoring of resource usage of the first application program in response to determining that the first application program is no longer in the background state.

15. The non-transitory machine-readable medium of claim 11, wherein the determining that the first application program exceeds the resource consumption threshold comprises determining that the average resource consumption over the duration of the detection period for the first application program exceeds the resource consumption threshold.

16. The non-transitory machine-readable medium of claim 15, wherein the first application program performs one or more of the following operations while in the background state:

(a) outputting audio;

(b) providing a location service;

(c) providing functions relative to a Bluetooth connection; or (d) performing network communications functions by sending or receiving data through one or more networks.

17. The non-transitory machine-readable medium of claim 11, further comprising terminating monitoring of resource usage of the first application program in response to determining that the first application program is running in the foreground.

18. A device to perform performance management, the device comprising:
- a processing system;
- a memory coupled to the processing system through a bus; and
- a process executed from the memory by the processing system causes the processing system to:
  - select a first application program for resource usage monitoring, wherein the first application program is running in a background state while the first application program is executing one or more first application tasks or one or more system tasks and is not directly interacting with the user or directly viewable by a user of the data processing system, and the first application program is not a daemon;
  - determine a resource consumption threshold and a detection period for the first application program having a first application program type, wherein the resource consumption threshold and the detection period for the first application program are based at least in part on the first application program type;
  - monitor a resource usage of the first application program, in response to selecting the first application program for resource usage monitoring and determining the resource consumption threshold and detection period for the first application program;
  - determine whether the monitored resource usage of the first application program exceeds the resource consumption threshold over the duration of the detection period;
  - terminate the first application program when the resource usage exceeds the resource consumption threshold over the duration of the detection period;
  - receive statistics characterizing one or more previous terminations of a plurality of application programs having the first application program type; and
  - dynamically adjust the detection period of the first application program type based on the statistics.

19. The device of claim 18, wherein the resource usage of the first application program exceeds the resource consumption threshold over the detection period when resource usage exceeds the resource consumption threshold for a period of time that is at least as long as the detection period.

20. The device of claim 18, wherein the resource consumption threshold comprises a CPU consumption threshold.

21. The device of claim 18, wherein the resource consumption threshold and the detection period are determined based on an analysis of resource usage by the first application program.

22. The method of claim 1, wherein the detection period is at least one minute.

23. The method of claim 1, wherein the resource usage fluctuates during the detection period, and monitoring resource usage comprises taking an average of a plurality of sampling points over the detection period, and determining that the first application program exceeds the resource consumption threshold comprises determining that a majority of the sample points over the interval exceed the resource consumption threshold.

24. The non-transitory machine-readable medium of claim 11, wherein dynamically adjusting comprises:
- increasing at least one of the detection period or the resource consumption threshold for applications having the first application program type, in response to the statistics indicating that fewer applications of the first application program type should be terminated, or
- decreasing at least one of the detection period or the resource consumption threshold for applications having the first application program type, in response to the statistics indicating that more applications of the first application program type should be terminated.

25. The method of claim 1, wherein the application program types comprises one of an email application, a game application, a web browser application or a media playing application.

26. The device of claim 18, wherein dynamically adjusting comprises:
- increasing at least one of the detection period or the resource consumption threshold for applications having the first application program type, in response to the statistics indicating that fewer applications of the first application program type should be terminated, or
- decreasing at least one of the detection period or the resource consumption threshold for applications having the first application program type, in response to the statistics indicating that more applications of the first application program type should be terminated.

27. The method of claim 1, further comprising:
dynamically adjusting the resource consumption threshold of the first application program type based on the statistics.

* * * * *